Oct. 9, 1945.  B. E. LUBOSHEZ  2,386,621
ARTIFICIAL HORIZON FOR SEXTANTS
Filed May 10, 1944   2 Sheets-Sheet 1

BENJAMIN E. LUBOSHEZ
INVENTOR

BY
ATTORNEYS

Oct. 9, 1945.  B. E. LUBOSHEZ  2,386,621
ARTIFICIAL HORIZON FOR SEXTANTS
Filed May 10, 1944  2 Sheets-Sheet 2

BENJAMIN E. LUBOSHEZ
INVENTOR

BY
ATTORNEYS

Patented Oct. 9, 1945

2,386,621

UNITED STATES PATENT OFFICE 2,386,621

ARTIFICIAL HORIZON FOR SEXTANTS

Benjamin E. Luboshez, Rochester, N. Y., assignor to Eastman Kodak Company, Rochester, N. Y., a corporation of New Jersey Application May 10, 1944, Serial No. 534,919

10 Claims. (Cl. 88—2.4)

The present invention relates to sextants and particularly to a combined optical system including a horizontal reflecting surface used as an artificial horizon.

In order to disclose the present invention, it is shown in association with a well-known type of marine sextant. However, it is pointed out, and it will be readily appreciated by those skilled in the art, that the present invention is not limited to use with a sighting instrument of this nature.

In bubble sextants, the image of a celestial object being observed is brought into coincidence with the image of a gravitationally controlled "bubble." I have found that for some purposes it is convenient to use a horizontal reflecting surface in order to define the horizontal, and in which case, two images of the celestial object are formed, and adjustment is obtained by bringing the two images into coincidence. The horizontal surface may take the form of a liquid (such as mercury) for use on land, or it may take the form of a pendulously mounted mirror gyroscopically stabilized for use on moving vehicles, such as tanks, aeroplanes, ships, etc.

It is important to design the combined optical system so that the direct view of the celestial object and its image may follow each other over the field of view in the same direction, and at the same speed when the instrument is rotated through small angles about an axis perpendicular to the vertical plane containing the line of sight. This, a fundamental property of any sextant that is to be used on moving vehicles, must be maintained at all cost; and the optical system I have designed meets this criterion.

One object of the present invention is the provision of a combined optical system for use with sighting instruments, and which system includes a horizontal reflecting surface in order to define the horizontal.

Another object is the provision of an artificial horizon, or combined optical system, which forms an image of the object being sighted upon in the field of view and which image is brought into coincidence with the image of the object as viewed directly.

And still another object is the provision of an artificial horizon of the type set forth which comprises a combined optical system, including the horizontal reflecting surface, by virtue of which the direct view of the object and its image deviated by said optical system may follow each other over the field of view in the same direction and at the same speed when the instrument is rotated through small angles about an axis perpendicular to a vertical plane containing the line of sight.

And another object is the provision of an artificial horizon of the type set forth which includes two constant light deviators symmetrically disposed on the sight axis of the instrument to cover only a part, or the whole, field of view, and a horizontal reflecting surface disposed between said deviators to one side of the sight axis to reflect the light deviated by one to the second deviator.

The novel features that I consider characteristic of my invention are set forth with particularity in the appended claims. The invention itself, however, both as to its organization and its methods of operation, together with additional objects and advantages thereof, will best be understood from the following description of specific embodiments when read in connection with the accompanying drawings in which, Fig. 1 is a side elevational view of a sextant incorporating an artificial horizon constructed in accordance with a preferred embodiment of the present invention, Fig. 2 is an end view of the sextant shown in Fig. 1 and looking from the observation point, Fig. 3 is a schematic view of a modified form of the present artificial horizon, Fig. 4 is an end view of the optical system shown in Fig. 3, and looking from the left side of the combined optical system and toward the eye-piece, and, Fig. 5 is a schematic view of a further modification of the present artificial horizon.

Like reference characters refer to corresponding parts throughout the drawings.

Figure 1:
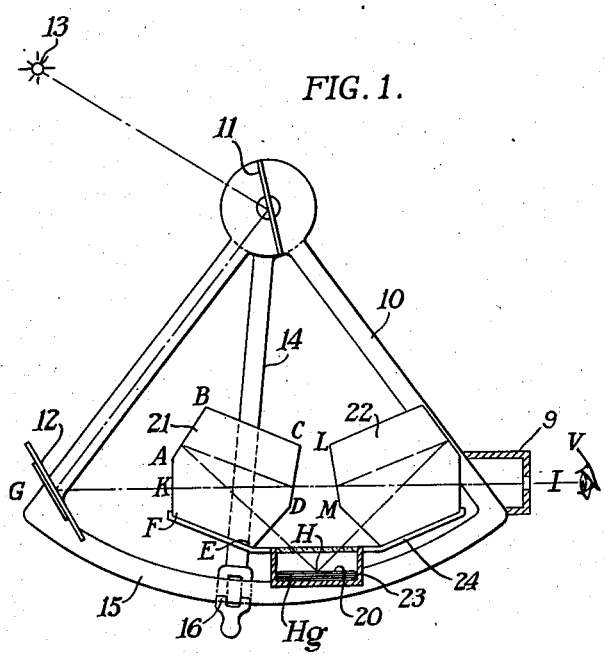
Figure 2:
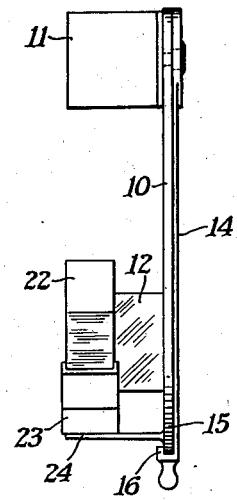

Referring now to Figs. 1 and 2, a preferred embodiment of the invention is shown in association with a marine sextant comprising a frame 10, including a pivotally mounted index mirror 11 and a fixed mirror 12. Light from a celestial body 13 strikes the index mirror 11 and is reflected to the fixed mirror 12 from which it is then reflected to the viewpoint V of the instrument. As is well known, the index mirror 11 is rotated by swinging the pivoted arm 14 until the image of the object being viewed is in coincidence with an artificial horizon which indicates the horizontal, and the angle that the index mirror makes with the fixed mirror indicates the altitude of the celestial object, and this angle is read off of the sector portion 15 of the frame which is embraced by an index rider 16 carried at the end of the arm.

Coming now to the present invention, the combined optical system constituting my artificial horizon comprises a horizontal reflecting surface 20 and a pair of identical constant deviation prisms 21 and 22 fixed to the frame 10 and disposed symmetrically on the line of sight of the instrument. While for purposes of illustration I have shown the horizontal reflecting surface as a pool of mercury Hg confined within a glass covered chamber 23 forming a part of the prism bracket 24, this horizontal reflecting surface can be any one of a number of different constructions. For instance, the horizontal reflecting surface might be a pendulously mounted mirror with a sufficiently long period of oscillation to adapt it to the purpose at hand; it might comprise a gyroscopically stabilized mirror; or it might comprise a mirror buoyantly supported in a quantity of suitable liquid. Therefore, since there are a number of different ways in which a horizontal reflecting surface may be provided, and the present invention is not concerned with, or limited to, the use of any one specific type of horizontal reflecting surface, a pool of mercury being disclosed only for purposes of illustration, this element forming a part of my novel combined optical system will hereinafter be referred to generally as a horizontal reflecting surface. Normally, the combined optical system comprising the prisms 21 and 22 and the horizontal reflecting surface 20 would be enclosed in a suitable housing to exclude extraneous light and to provide an eye-piece indicated at 9, but for purposes of clarity this housing has been omitted from the drawings.

Figure 6:
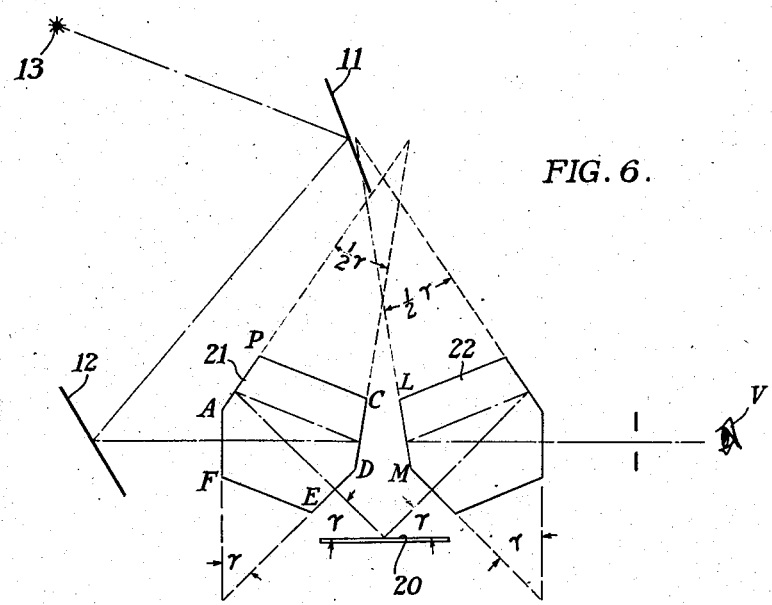
Fig. 6 is a schematic showing of the present artificial horizon showing the relationship between the angles of the reflecting surfaces of the two prisms and the direction of the rays striking the horizontal reflecting surface.

As clearly shown in Fig. 2, the combined optical system may be arranged so as to cover only one-half of the field of view, or to receive only one-half of the incoming light, the other half being directly reflected to the observer at viewpoint V of the fixed mirror 12. Consider for the moment only the prism 21 which is so mounted that the surface AF is perpendicular to the incoming light GK. This incoming light after entering the surface AF continues until it strikes the silvered surface CD, whence it is reflected to the silvered surface AB. After reflection from AB, the light passes normally through the surface ED, striking the horizontal reflecting surface 20 at H. As shown in Fig. 6, if the angle at which this ray strikes the reflecting surface 20 be $\gamma$ then the angle between the two surfaces AB and CD of the prism would be one-half of $\gamma$ the angle between the surfaces AF and ED of the prism would be of course, $\gamma$. So long as the reflecting surface 20 remains horizontal, the ray reflected from it will likewise make the angle $\gamma$ with it, and upon passing through the prism 22 and being twice reflected will emerge in the original direction of the ray GK, or horizontal.

Inasmuch as the optical assembly covers only one-half of the field of view, a slight "swinging" of the whole instrument will permit the observer to see two images of the celestial object. One of these images will be seen directly along the line GI and the other after passage through the combined optical system. Since only parallel light is being utilized, the difference in the length of paths traversed by the rays that have been deviated by the combined optical system and those that come straight through is of no importance.

It is necessary to consider what happens when the whole instrument is rotated through a small angle about an axis perpendicular to the plane of the drawings. Consider first the more direct rays, or the straight through ones. It is well known that so long as the angle of the index mirror 11 has been correctly adjusted in order that the ray GI may be truly horizontal, the angle of elevation of the celestial object is given by twice the angle between the index mirror 11 and the fixed mirror 12 and that further rotation as we have been considering would have no effect whatever upon the direction of the direct ray GKI. This is a fundamental property of all marine sextants since the two mirrors 11 and 12 act in combination as a constant deviator.

Consider next what happens to that part of the incoming rays GK which are deviated by the combined optical system under the same conditions. It is clear that so long as the reflecting surface 20 remains horizontal, the light emerging from the first prism 21 will strike it at the original angle $\gamma$ because, although the prism 21 has been rotated relatively to the incoming light GK, the effect of the prism is still to deviate the light through twice the angle between its surfaces AB and CD, or twice one-half of $\gamma$. This is a specific property of the type of prism chosen. After reflection from the horizontal reflecting surface 20, the second prism 22 is traversed, and although the path of the light is no longer symmetrical as it was when the whole instrument was horizontal, the emergent rays will still be truly horizontal. It will be noted that it has been assumed that the reflecting surface 20 remains horizontal in spite of the fact that the whole instrument has been rotated. Under these conditions, the two images of the celestial object 13 can be brought into coincidence, this being achieved by suitable rotation of the index mirror 11. In other words, if the reflecting surface 20 is so arranged as to always take up the horizontal position, the sextant will indicate altitudes as long as coincidence is obtained in any part of the visual field.

Figure 3:
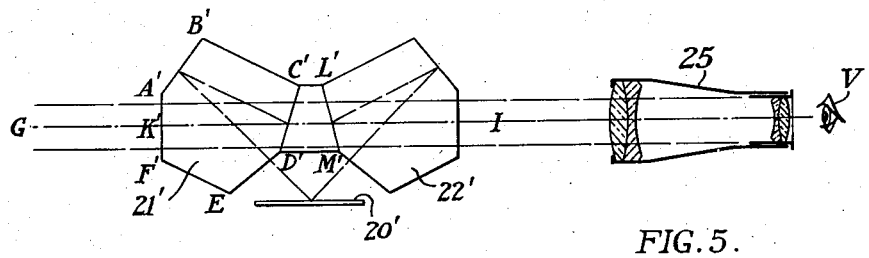
Figure 4:
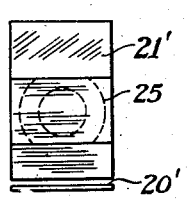

In Figs. 3 and 4, I have shown an embodiment of the present invention which permits simultaneous viewing of both images of the object sighted upon, and which, however, is only suitable when some loss of light is not objectionable. In this instance, the combined optical system again includes two identical constant deviation prisms 21' and 22', and the horizontal reflecting surface 20', all disposed with respect to one another and the sight axis of the instrument as described above. A small prism C'D'M'L' is cemented between the two prisms 21' and 22', as shown, the whole prism assembly being wide enough to cover the whole field of view, see Fig. 4. The surfaces C'D' and M'L' are partially silvered so that some of the rays pass straight through the assembly, while the remainder of the rays are reflected twice within each prism and once at the horizontal reflecting surface 20'. It goes without saying that the prism C' D' M' and L' has the same refractive index as the prisms 21' and 22' so that the light passing directly through the prism assembly suffers no deleterious deviation. Instead of using the prism C'D'M'L', the same result could be obtained by the use of adjustable wedges between the two prisms 21' and 22' to overcome the unwanted deviation in the light due to passage from glass to air and vice versa; or a volume of liquid of the proper refractive index could be inserted at this point, the same being so arranged that the surfaces C'D' and M'L' of the two prisms would be entirely wetted at all times by the liquid. A telescopic system 25 of suitable power may, however, be inserted between the exit face of prism 22' and the eye, and which eyepiece will not only tend to make up for the loss of light due to transmission of light directly through the prism assembly, but will also cut down the undesirable lateral shift of the image as the instrument is moved laterally and which shift is inherent in systems made up entirely of reflecting surfaces with no lenses.

Figure 7:
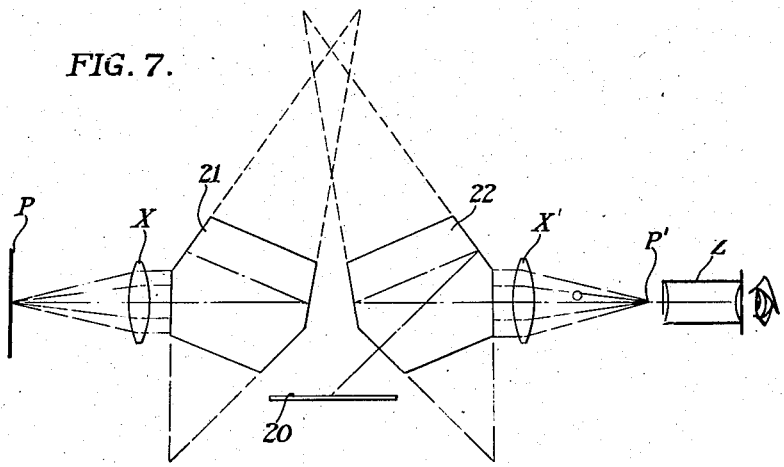
Fig. 7 is a schematic showing of another embodiment of the present invention.

If the present combined optical system is to be used on instruments having intermediate telescopic systems, a collimating lens can be used in front of the prism assembly to send parallel rays thereinto, and a second collimating lens can be used immediately behind the prism assembly to again converge the rays to a focal plane where the image is to be viewed by an eye lens. Such an arrangement is shown schematically in Fig. 7 wherein P represents the plane where the telescopic real image of the object would be formed, X is a collimating lens sending its parallel bundle of rays to a similar lens X', the final image being formed at plane P'. This is viewed by the eye behind the eyepiece Z. The prismatic assembly of the present invention, including prisms 21 and 22 and horizontal reflecting surface 20, is inserted between the lenses X and X' as shown.

Figure 5:
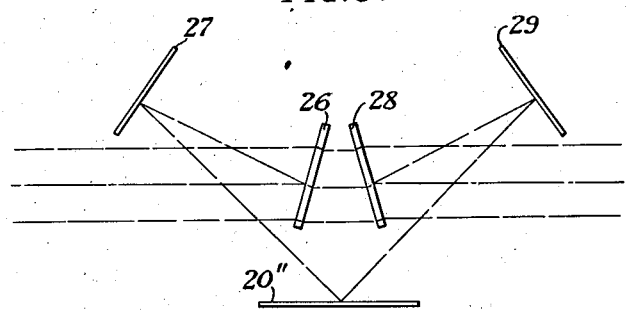

In Fig. 5 I have shown another embodiment of the present invention in which the constant deviation prisms are replaced by two pairs of mirrors. While all of the mirrors can be totally reflecting and arranged so that the system covers only one-half of the field of view, as in the case of the prismatic assembly shown in Fig. 1, I have illustrated the mirror system as being of the type which covers the entire field of view, as in the second embodiment using prisms and as shown in Figs. 3 and 4.

Referring now to Fig. 5, the first prism is replaced by two mirrors 26 and 27 and the second prism is replaced by mirrors 28 and 29. Each of these pairs of mirrors are fixed to the frame of the instrument relative to one another, the line and sight of the instrument and a horizontal reflecting surface 20'' so as to function in exactly the same manner as the reflecting surfaces of the prisms in the previously described embodiments. Accordingly, each pair of mirrors acts to deviate the light by a constant amount depending upon the angle between the same, and they are the equivalent of the prisms so far as function is concerned. Due to this equivalency, in the claims the prism and/or pairs of mirrors will be referred to as constant light deviators. As shown in Fig. 5, the two mirrors 26 and 28 which cut across the sight axis, are partially transmitting so that certain of the rays pass directly to the viewpoint. Although the light upon passing through these mirrors is deviated by a parallel plate action, the deviation of the light by each mirror will be in opposite directions and will cancel out if two mirrors are of the same thickness.

Although I have shown and described certain specific embodiments of my invention, I am fully aware that many modifications thereof are possible. My invention, therefore, is not to be limited to the precise details of construction shown and described, but is intended to cover all modifications coming within the scope of the appended claims.

Having thus described my invention, what I claim as new and desire to secure by Letters Patent of the United States is:

1. An artificial horizon for use on an instrument for determining the direction of an object relative to the horizontal plane including an optical system for directing an image of the object sighted upon to a viewpoint along a sight axis, a portion of which is horizontal in normal use of the instrument, and comprising a horizontal reflecting surface disposed vertically to one side of the horizontal portion of said sight axis; and a pair of constant light deviators, each having two reflecting surfaces inclined at less than 45 degrees to each other, intersecting said horizontal portion of the sight axis and adapted to deviate part of said rays passing along said axis while allowing the remainder to pass therealong to the viewpoint, said light deviators displaced from one another along said horizontal portion of the sight axis and disposed vertically relative to said horizontal reflecting surface so that the rays of light leaving one of said deviators strikes the horizontal reflecting surface at an angle less than 90 degrees and are in turn reflected into the second deviator from whence they are directed to the viewpoint of the instrument to be viewed simultaneously with the rays passing directly along the sight axis.

2. An artificial horizon according to claim 1 in which said light deviators cover only a portion of the field of view of the instrument and the reflecting surfaces thereof are totally reflecting.

3. An artificial horizon according to claim 1 in which said light deviators cover the entire field of view of the instrument and the reflecting surfaces thereof which extend across the sight axis are partially transmitting, whereby part of the light rays pass therethrough along the sight axis to the viewpoint.

4. An artificial horizon according to claim 1 in which each of said light deviators comprises a constant deviation prism.

5. An artificial horizon according to claim 1 in which each of said light deviators comprises a pair of mirrors having a fixed angular relationship.

6. In an instrument for determining the direction of an object relative to the horizontal plane the combination with an optical means for directing an image of the object being sighted upon to an eyepiece along a sight axis, a portion of which is horizontal in the normal use of the instrument; the combination of a horizontal reflecting surface vertically disposed to one side of said horizontal portion of the sight axis; a pair of bi-reflecting constant deviation prisms, each of which has an angle of deviation less than 90 degrees, cutting across the horizontal portion of said sight axis and covering the entire field of view; said prisms displaced from one another along said sight axis and vertically disposed relative to said horizontal reflecting surface whereby the light leaving one prism strikes said horizontal reflecting surface and is directed into said other prism to be directed to the viewpoint; the reflecting surface of each prism which intersects said sight axis being partially transmitting; and means for rendering said last-mentioned reflecting surfaces of the prisms non-refractive to eliminate deviation of the light rays transmitted directly through the prisms along said sight axis.

7. An instrument according to claim 6 in which said last-mentioned means comprises a volume of transparent material having substantially the same refractive index as the material from which the prisms are made disposed between the partially transmitted surfaces of said prisms and in optical contact with each of said surfaces.

8. An instrument according to claim 6 in which said last-mentioned means includes a block of transparent material having the same index of refraction as the prisms interposed between said prisms and having two opposing surfaces thereof in optical contact with the respective transmitting-reflecting surfaces of said two prisms.

9. An artificial horizon according to claim 1 in which each of said light deviators comprises a pair of mirrors having a fixed angular relationship and one of said mirrors being partially transmitting, each of said light deviators fixed to the instrument so that the partially transmitting mirror thereof extends across the sight axis and covers the field of view, whereby part of the light rays pass directly along the sight axis without being reflected by said mirrors, said partially transmitting mirrors being of substantially the same thickness and having substantially the same refractive index so that the deviation in the sight axis due to its passage through one of said partially reflecting transmitting mirrors is accounted for by the deviation in the sight axis due to its passing through the other of said partially transmitting mirrors.

10. In a sextant the combination with a frame; an index mirror movably mounted on said frame; a fixed mirror on said frame; and an eyepiece fixed to said frame in optical alignment with said fixed mirror for viewing the field of view reflected by said fixed mirror; of a horizontal reflecting surface carried by said frame and disposed vertically to one side of that portion of the sight axis between said eyepiece and fixed mirror; and a pair of identical bi-reflecting constant light deviators, each having a deviation angle of less than 90° fixed to said frame and having one of the reflecting surfaces of each cutting across that portion of the sight axis vertically disposed relative to said horizontal reflecting surface; said deviators being so disposed that one deviates rays of light from said sight axis onto said horizontal reflecting surface which in turn reflects them into said second deviator which directs them to said eyepiece.

BENJAMIN E. LUBOSHEZ.